United States Patent
Srinivasan

(12) 
(10) Patent No.: US 6,309,987 B1
(45) Date of Patent: Oct. 30, 2001

(54) NONWOVEN FABRIC HAVING BOTH UV STABILITY AND FLAME RETARDANCY

(75) Inventor: Ramesh Srinivasan, Mauldin, SC (US)

(73) Assignee: BBA Nonwovens Simpsonville, Inc., Simpsonville, SC (US)

( * ) Notice: Subject to any disclaimer, the term of this patent is extended or adjusted under 35 U.S.C. 154(b) by 0 days.

(21) Appl. No.: 09/294,160

(22) Filed: Apr. 19, 1999

Related U.S. Application Data

(60) Provisional application No. 60/082,367, filed on Apr. 20, 1998.

(51) Int. Cl.$^7$ .................... B32B 24/04; B32B 27/12; B32B 5/26
(52) U.S. Cl. .................... 442/147; 442/131; 442/136; 442/146; 442/381; 442/382; 442/400; 442/401; 442/417; 428/920; 428/921
(58) Field of Search .................... 442/131, 136, 442/146, 147, 381, 382, 400, 401, 417; 428/920, 921

(56) References Cited

U.S. PATENT DOCUMENTS

| | | | |
|---|---|---|---|
| 4,237,157 | 12/1980 | Hancock | 427/352 |
| 4,374,888 | 2/1983 | Bornslaeger | 428/198 |
| 4,411,928 | 10/1983 | Baldwin | 427/2 |
| 4,467,013 | 8/1984 | Baldwin | 428/289 |
| 4,818,597 | 4/1989 | DaPonte et al. | 428/284 |
| 4,822,667 | 4/1989 | Goad et al. | 428/265 |
| 4,871,795 | 10/1989 | Pawar | 524/267 |
| 4,910,078 * | 3/1990 | Hill et al. | 428/290 |
| 4,919,998 | 4/1990 | Goad et al. | 428/265 |
| 5,004,770 | 4/1991 | Cortolano et al. | 524/99 |
| 5,024,851 | 6/1991 | Goad et al. | 427/2 |
| 5,096,950 | 3/1992 | Galbo et al. | 524/99 |
| 5,124,378 | 6/1992 | Behrens et al. | 524/95 |
| 5,145,727 | 9/1992 | Potts et al. | 428/198 |
| 5,149,576 | 9/1992 | Potts et al. | 428/198 |
| 5,151,321 | 9/1992 | Reeves et al. | 428/286 |
| 5,178,931 | 1/1993 | Perkins et al. | 428/198 |
| 5,178,932 | 1/1993 | Perkins et al. | 428/198 |
| 5,300,647 | 4/1994 | Malherbe et al. | 546/188 |
| 5,312,853 | 5/1994 | Staendeke et al. | 524/100 |
| 5,352,762 * | 10/1994 | Nagai et al. | 528/322 |
| 5,393,812 | 2/1995 | Haley et al. | 524/91 |
| 5,430,081 | 7/1995 | Ohmae et al. | 524/100 |
| 5,455,292 | 10/1995 | Kakegawa et al. | 524/141 |
| 5,482,765 | 1/1996 | Bradley et al. | 428/286 |
| 5,498,463 | 3/1996 | McDowall et al. | 428/198 |
| 5,534,340 | 7/1996 | Gupta et al. | 428/286 |
| 5,582,904 | 12/1996 | Harrington | 428/224 |
| 5,597,647 | 1/1997 | Powers | 442/382 |
| 5,688,157 | 11/1997 | Bradley et al. | 442/340 |
| 5,705,251 | 1/1998 | Morman et al. | 428/114 |
| 5,733,822 | 3/1998 | Gessner et al. | 442/35 |
| 5,834,384 | 11/1998 | Cohen et al. | 442/382 |
| 5,919,341 | 8/1999 | Brown et al. | 442/351 |

FOREIGN PATENT DOCUMENTS 0792 911 A2  9/1997  (EP) .................... C08K/5/3435

OTHER PUBLICATIONS

Technical Brochure for S–125125E117—Sky Blue Hydrophobic Concentrate from Techmer PM, California, no date given.
Product Information Brochure for FX–1801—Melt Additive Repellent from 3M, no date given.
Technical Brochure for CGL 116—Light Stabilizer from Ciba, New York, no date given.
PPM 11350 Flame Retardant, Technical Bulletin, Techmer PM, CA, TN, GA, Apr. 1998.
UV Stabilizer is also a flame retardant, Technology Newsfocus, Plastics Technology, Mar. 1998.
A Revolutionary UV Stable Flame Retardant System for Polyolefins, Rangarajan Srinivasan, Anunay Gupta and Douglas Horsey, Ciba Specialty Chemicals Corporation, New York—Presented at The International Conference for Additives for Polyolefins, Texas, Feb. 23–25, 1998.
S–215125E117 Sky Blue Hydrophobic Concentrate, Technical Bulletin, Techmer PM, CA, TN, Jan. 1998.
A Revolutionary UV Stable Flame Retardant System for Polyolefin Fiber and Film: CGL–116, Ciba, New York, no date given.

\* cited by examiner

*Primary Examiner*—Elizabeth M. Cole
*Assistant Examiner*—Ula C. Ruddock
(74) *Attorney, Agent, or Firm*—Ostrager Chong & Flaherty, LLP

(57) ABSTRACT

A nonwoven fabric with UV stability and flame retardancy having at least one fabric layer. The fabric layer is made of a base resin, preferably polyolefinic, and a non-halogenated melt processable compound that is selected from the group consisting of N-alkyoxy amines and are combined into a homogeneous blend which is then either spunbonded or meltblown to form the fabric layer. A melt processable fluorochemical additive may also be combined into the homogeneous blend to provide liquid barrier properties to the fabric layer.

12 Claims, 1 Drawing Sheet

NONWOVEN FABRIC HAVING BOTH UV STABILITY AND FLAME RETARDANCY

RELATED APPLICATION

This application claims the benefit of U.S. Provisional Application No. 60/082,367, filed on Apr. 20, 1998.

FIELD OF THE INVENTION

The invention relates to flame-retardant, UV stable nonwoven fabrics suitable for medical and industrial uses. In particular, the invention relates to nonwoven fabrics made using a non-halogenated melt processable compound that is both flame retardant and UV stable selected from the group consisting of N-alkyoxy amines. Thermally stable fluorochemical derivatives can also be incorporated into the nonwoven fabrics to further impart liquid barrier properties to the fabric.

BACKGROUND OF THE INVENTION

Flame retardant nonwoven composites are needed in a variety of applications like medical garments, drapes and fire fighting suits. Research indicates that 80 to 100 operating room fires alone occur each year, and 10 to 20 of those result in serious injury. The introduction of lasers, and other advanced electrical equipments in surgery today have also greatly increased the potential for fires in the operating rooms.

Existing flame retardant chemicals to manufacture such fibers/fabrics via melt spinning are not environmentally friendly and are also toxic. They also weaken the final fabric properties and have an adverse effect on machinery by initiating metal corrosion. Examples of such flame retardant chemicals that are widely used include phosphorous compounds, metal hydrates and halogenated (brominated) compounds in synergistic combination with antimony oxides.

Nonwovens and nonwoven composites possessing both liquid barrier and flame retardancy are desired in many medical applications like surgical drapes (particularly in opthamology) and operating room accessories. Such materials have to provide a barrier to low surface tension liquids such as isopropyl alcohol while offering flame retardancy simultaneously. Prior to the invention, the combination of flame retardancy and liquid barrier property incorporated in the same nonwoven was hitherto not achievable in a single step process.

Nonwoven fabrics possessing light stability (particularly ultraviolet) are used as substrates to manufacture outdoor covers. Outdoor covers include marine, automobile, bike and recreational vehicle covers. Such covers include protecting the vehicle from wear and tear caused by wind, rain and sunlight.

Nonwovens and nonwoven composites to manufacture substrates for such covers are available in the market. However, it was not possible hitherto to incorporate UV stability and flame retardancy in one step using internal melt additives to produce a nonwoven or nonwoven composite.

To overcome these problems the invention provides a combination of light stability and flame retardancy incorporated into a nonwoven using a non-halogenated melt processable compound. Preferably the compound is a N-alkyoxy hindered amine light stabilizer (NOR-HALS).

In general use of alkoxyamine functional hindered amine light stabilizers (NOR-HALS) to improve the flame retardant properties of polyolefins, including polyolefins used in fabrics, is known. For example, published European patent application EP 0792911 A2 to Tennesen discloses a phosphate based flame retardant combined with alkoxyamine functional hindered amine light stabilizer to achieve flame retardant properties that are better than those with phosphates alone. There is no disclosure or suggestion in Tennesen that the light stabilizer alone be used as the only flame retardant.

U.S. Pat. No. 5,393,812 to Haley describes fibers and fabrics, as used clothing, upholstery and carpeting which contain about 0.01 to 3% (preferably 0.2 to 1.0%) by weight of the composition, of a light stabilizer. This patent discloses a polyolefin, a NOR HALS (alkoxy amine functional hindered amine light stabilizers) and a phosphorous flame retardant (col. 2 line 33–40; col. 4 line 62–64). Regular HALS (hindered amine light stabilizers) may be employed additionally or in place of NOR HALS.

U.S. Pat. No. 5,096,950 to Galbo discloses numerous N-OR1 alkoxy hindered amine light stabilizers. This patent also notes that the N-OR1 class of HALS can function in the presence of organohalogenated flame retardants and thiosynergists, unlike prior art hindered amine compounds.

Thus it is a broad object of the invention to provide a nonwoven fabric with both UV stability and flame retardancy having at least one fabric layer. The fabric layer is made of a resin, preferably polyolefinic resin, combined with a non-halogenated melt processable compound that is both flame retardant and UV stable. The compound is preferably a N-alkoxy hindered amine and is combined with a base polyolefinic resin into a homogeneous blend which is then either spunbonded or meltblown to form the fabric layer.

Another object of the invention is to provide a nonwoven fabric of that is alcohol repellant in addition to being flame retardant and UV stable. A melt processable fluorochemical additive is added to the homogeneous blend to impart liquid barrier properties to the fabric layer.

A specific object of the invention is to provide a nonwoven UV stable, flame retardant structure that is environmentally friendly and non-toxic.

Another specific object of the invention is to provide a liquid barrier nonwoven fabric or composite that has flame retardant properties suitable for medical use.

A further object of the invention is to provide an outdoor cover substrate having UV stability and flame retardancy in a single step process.

A further specific object of the invention is to provide a method for making the nonwoven fabric of the invention utilizing melt processable additives without initiating metal corrosion.

SUMMARY OF THE INVENTION

The present invention provides a nonwoven fabric suitable for medical and industrial uses made using a non-halogenated melt processable compound that is both flame retardant and UV stable selected from the group consisting of N-alkyoxy amines. Preferably the compound is a N-alkoxy hindered amine light stabilizer (NOR-HALS), known as CGL 116, available from Ciba Specialty Canada (Mississauga, Ontario, Canada).

Improved product properties are obtained by compounding the non-halogenated melt processable compound with a carrier resin. The carrier resin is preferably a polyolefinic resin, which includes the melt processable compound, and is combined with a base polyolefinic resin to form a homogeneous blend. This blend is then either spunbonded or meltblown to form the fabric layer or layers of the invention. The final add-on quantity of the melt processable compound to the fabric layer is 0.3%–1.5 wt. % with a particularly preferred range of 0.3%–0.6 wt. % for medical garments, drapes and fire fighting suit applications; and 0.75–1.5 wt. % for outdoor cover applications.

The nonwoven fabric of the invention may comprise multiple fabric layers. Fabric structures encompassed by the invention include spunbond (SB), meltblown (MB), spunbond-spunbond (SS), spunbond-meltblown-spunbond (SMS), spunbond-spunbond-spunbond (SSS), spunbond-meltblown-meltblown-spunbond (SMMS) nonwoven fabrics, as well as other combinations and variations of the foregoing.

There are three preferred applications for the flame-retardant, UV stable nonwoven fabrics of the invention. One is a substrate used in making composite fabrics for outdoor covers include marine craft, automobiles, bicycles and recreation vehicles. The nonwoven material can also be used as flame-retardant, environmental friendly medical drapes and fire fighting suits. This material is environmentally friendly because it is non-halogenated. Finally, fluid resistant agents such as thermally stable fluorochemical derivative can be incorporated into the nonwoven which can then serve as a liquid barrier, particularly to low surface tension liquids such as isopropyl alcohol.

Other objects, features and advantages of the present invention will be apparent when the detailed description of the preferred embodiments of the invention are considered with reference to the drawings, which should be construed in an illustrative and not limiting sense as follows:

DETAILED DESCRIPTION OF THE PREFERRED EMBODIMENTS

Figure 1:
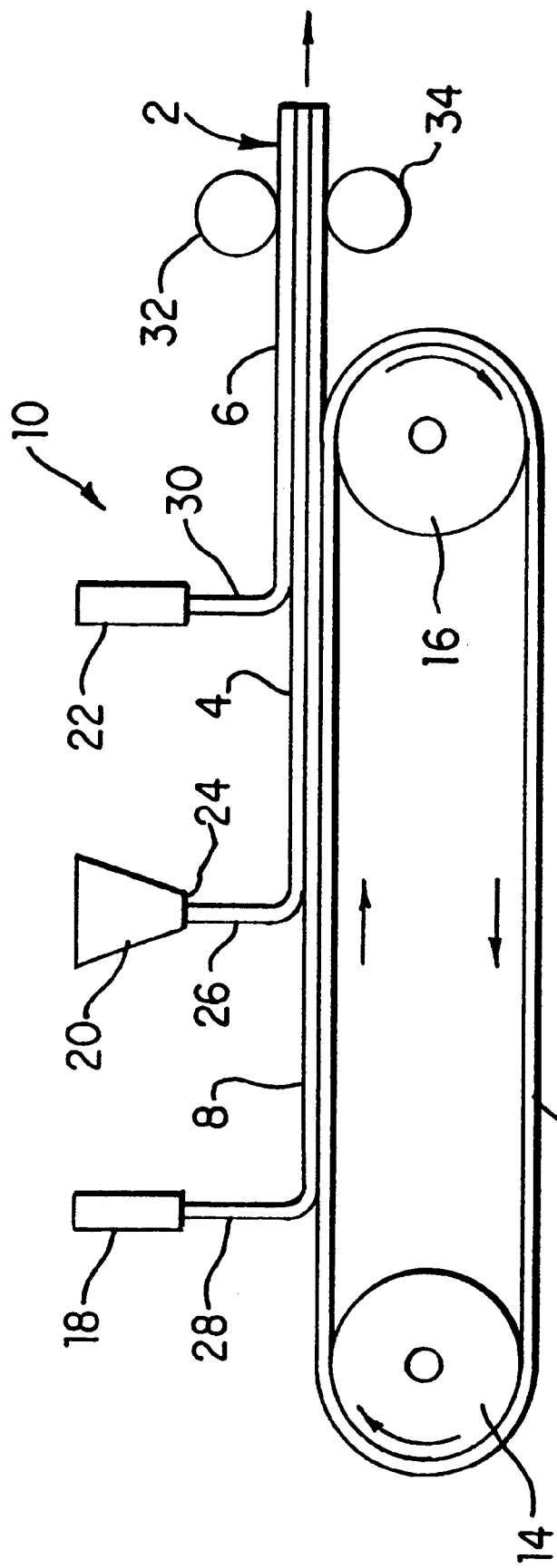
FIG. 1 is a schematic diagram showing the basic components of a system for producing the nonwoven fabric in accordance with the process of the invention.

As used herein, the term "nonwoven web" or "nonwoven fabric" are interchangable and refer to a web/fabric that has a structure of individual fibers or filaments which are interlaid, but not in an identifiable repeating pattern.

As used herein, the term "spunbonded fibers" refers to fibers which are formed by extruding molten thermo-plastic material as filaments from a plurality of fine, usually circular capillaries of a spinnerette. Cooling air is fed to a quenching chamber wherein the filaments are cooled. The cooling air is then sucked through a nozzle, which accelerates the flow of air. The friction between the flowing air and the filaments creates a force which draws the filaments, i.e., attenuates the filaments to a smaller diameter. The drawn filaments are then passed through a diffusion and deposited on a conveyor belt to form a nonwoven web. A conventional spinbonding technique is disclosed in U.S. Pat. No. 4,340,563 to Appel.

As used herein, the term "meltblown fibers" refers to fibers which are formed by extruding molten thermo-plastic material as threads or filaments through a plurality of fine, usually circular capillaries of a die. A high-velocity, usually heated gas (e.g., air) stream attenuates the filaments of molten thermoplastic material to reduce their diameter. Thereafter the meltblown fibers are carried by the high-velocity heated gas stream and are deposited on a collecting surface to form a web of randomly dispersed meltblown fibers. A conventional meltblowing technique is disclosed in U.S. Pat. No. 4,707,398 to Boggs.

Meltblown fibers differ from spunbonded fibers in that the extruded polymer strands have much finer diameters. These fine diameter filaments are easily dispersed by the forced hot air stream before being deposited on the collecting surface. In addition, the meltblown fibers are substantially cooled by the air so that they do not significantly bond together. Bonding of the web to retain integrity and strength occurs as a separate downstream operation.

In general, the invention provides a nonwoven fabric with UV stability and flame retardancy having at least one fabric layer. The fabric layer comprises a resin, preferably a polyolefinic resin, and a non-halogenated melt processable compound that is both flame retardant and UV stable selected from the group consisting of N-alkyoxy amines. The resin and said compound are combined into a homogeneous blend which is either spunbonded or meltblown to form the fabric layer.

"Non-halogenated" flame retardants are the general class of melt processable additives that are suitable to manufacture the nonwoven of the invention. Non-halogenated flame retardants are those that do not contain halogenated compounds like bromine. Under such non-halogenated class of additives, the preferred class of chemicals are based on N-alkoxy amine chemistry.

A most preferred system is the N-alkoxy hindered amine light stabilizer known as CGL 116 available from Ciba Specialty Canada (Mississauga, Ontario, Canada). The technical brochure of CGL 116 is incorporated herein by reference. CGL 116 is a non-halogenated N-alkoxy (N-OR2) HALS with flame retardant and UV stability properties and refers to 1,3-propanediamine, N, N"-1,2-ethanediylbis-, reaction products with cyclohexane and peroxidized N-butyl-2,2,6,6-tetramethyl-4-piperidinamine-2,4,6-trichlor-1,3,5-triazine reaction products. N-alkoxy hindered amines are in a more active oxidation state than conventional hindered amine light stabilizers (HALS).

The preferred range of N-alkyoxy hindered amine in the final fabric layer is between 0.3 and 1.5 wt. % (or 3000 to 15,000 ppm). A more preferred amount of the N-alkoxy hindered amine is 0.3–0.6 wt. %. Typically, concencentrations of the N-alkoxy hindered amine of more than 1.5 wt. % on the fabric was found to lead to a decrease in the flame retardant characteristics of the polyolefinic fabrics.

The base resins and carrier resins used in making the nonwoven fabric are selected from the group consisting of polypropylene, polyethylene, polyester and polyamide, or mixtures thereof. Polyolef inic resins are preferred and a most preferred resin is polypropylene.

The homogeneous blend may further include $TiO_2$ as a synergist to increase the flame retardancy of the N-alkoxy hindered amine. The $TiO_2$ used in the present invention is either rutile or anatase, which are different morphological/crystalline structures of $TiO_2$. The amount of $TiO_2$ in the final fabric layer is between 0.2 to 2 wt. % (2000 and 20,000 ppm).

If liquid barrier properties are desired in the final fabric a melt processable fluorochemical additive may be added to the homogeneous blend. The fluorochemical class of additives that are useful in the invention are thermally stable and facilitate the attachment of active fluorine to the polyolefinic backbone rendering it resistant to certain fluids, particularly low surface tension fluids like alcohols. In a preferred application, the fluorochemical additive provides alcohol repellenancy to the fabric layer.

Examples of fluorochemical additives that can be used in the invention are the fluorochemical urethane derivatives, such as S215125E117 commercially available by Techmer PM, Tennessee; and FX1801 or L41990 commercially available from 3M, Toronto, Ontario, Canada.

Typically, the melt processable fluorochemical additives are present in the final fabric layer between 0.1 to 2 wt % (5000 to 20,000 ppm), more preferred between 0.5 to 2 wt. %. Concentrations of the fluorochemical of more than 1.0 wt. % on the fabric was found to lead to excessive static generation during melt spinning thereby affecting filament laydown and final fabric uniformity. To overcome this problem, antistatic chemicals in the range of 0.1 to 1 wt. %, preferably 0.3–0.6 wt. %, can be added.

The homogeneous blend is either spunbonded or meltblown to from a fabric layer. The nonwoven fabric can be a single fabric layer but may comprise multiple fabric layers. Fabric structures encompassed by the invention include spunbond (SB), meltblown (MB), spunbond-spunbond (SS), spunbond-meltblown-spunbond is (SMS), spunbond-spunbond-spunbond (SSS), spunbond-meltblown-meltblown-spunbond (SMMS) spunbond-spunbond-spunbond-spunbond (SS-SS), spunbond-meltblown or vice versa (SM or MS), spunbond-meltblown-spunbond-spunbond-meltblown-spunbond (SMS-SMS), spunbond-meltblown-meltblown-spunbond-spunbond-meltblown-meltblown-spunbond (SMMS-SMMS) and nonwoven fabrics, as well as other combinations and variations of the foregoing.

The invention also provides a method of making a nonwoven fabric with UV stability and flame retardancy having at least one fabric layer comprising the steps of combining a base resin with a carrier resin to form a homogeneous blend.

The carrier resin comprises an additional resin, that is preferably polyolefinic, and a non-halogenated melt processable compound that is both flame retardant and UV stable selected from the group consisting of N-alkyoxy amines. The homogeneous blend is either spunbond or meltblown to form the nonwoven fabric layer.

As previously mentioned the base resin and said additional resin are preferably polyolefinic and in particular either polypropylene or polyethylene.

In making a preferred spunbond fabric layer of the invention, the base polyolefinic resin is a polypropylene resin having a MFR between 20 to 70 and the additional polylolefinic resin is a polypropylene resin having a MFR between 4 to 60.

In making a preferred meltblown fabric layer of the invention the base polyolefinic resin and said additional polyolefinic resin are polypropylene resins having a MFR between 300 to 1400.

In an alternate embodiment the additional polyolefinic resin in the carrier resin may be a combination of polypropylene and polyethylene resins.

In a preferred embodiment the carrier resin comprises 75–90 wt. % polypropylene and 10–25 wt. % of a N-alkoxy hindered amine.

In another embodiment the carrier resin may further include $TiO_2$. Preferably the carrier resin comprises 12–22 wt. % of a N-alkoxy hindered amine; 39–49 wt. % $TiO_2$; and 33–43 wt. % of said additional polyolefinic resin.

In another embodiment the carrier resin may further include a melt processable fluorochemical additive which imparts liquid barrier properties to said fabric layer. Preferably the carrier resin comprises:10–20 wt. % of a N-alkoxy hindered amine; 10–20 wt. % of said melt processable fluorochemical additive; and 70–90 wt. % of said additional polyolefinic resin.

In general the fabric layers of the invention are either spunbond or meltblown. The nonwoven fabric has at least one fabric layer, but structures with multiple fabric layers are included in the invention.

In an embodiment of the invention, a nonwoven fabric having at least two of the fabric layers is formed by spinbonding the homogeneous blend to form a first and second nonwoven fabric layers followed by thermally bonding the layers together.

In another embodiment of the invention, a nonwoven fabric having at least two of the fabric layers is formed by spinbonding the homogeneous blend to form a first nonwoven fabric layer and meltblowing the homogeneous blend to form a second nonwoven fabric layer followed by thermally bonding the layers together.

In another embodiment of the invention, a nonwoven fabric having at least three of the fabric layers is formed by spinbonding the homogeneous blend to form a first, second and third nonwoven fabric layer followed by thermally bonding the layers together.

In another embodiment of the invention, a nonwoven fabric having at least three of the fabric layers is formed by spinbonding the homogeneous blend to form first and third nonwoven fabric layers and meltblowing the homogeneous blend to form a second nonwoven fabric layer. The meltblown second layer is sandwiched between the first and third layers followed by thermally bonding the layers together.

In another embodiment of the invention, a nonwoven fabric having at least four of the fabric layers is formed by spinbonding the homogeneous blend to form first and fourth nonwoven fabric layers and meltblowing the homogeneous blend to form second and third nonwoven fabric layers. Sandwiching the second and third layers between the first and fourth layers and thermally bonding the layers together.

In another embodiment of the invention, a nonwoven fabric having at least five of the fabric layers is formed by spinbonding the homogeneous blend to form first and second nonwoven fabric layers. Meltblowing the homogeneous blend to form third and fourth nonwoven fabric layers on top of the first and second fabric layers and spinbonding the homogeneous blend to form a fifth nonwoven fabric layer, which is on top of the fourth fabric layer followed by thermally bonding the layers together.

In another embodiment of the invention, a nonwoven fabric having at least two of the fabric layers is formed by spinbonding or meltblowing said homogeneous blend to form a first and second nonwoven fabric layer and sandwiching a film material between the first and second fabric layers followed by ultrasonically bonding said layers together.

FIG. 1 is a schematic diagram showing the basic components of a system for producing the nonwoven fabric in accordance with the process of the invention.

As previously described the nonwoven fabric of the invention has at least one fabric layer. The fabric layer preferably comprises a polyolefinic resin and a carrier resin which includes the non-halogenated melt processable compound and, in some embodiments, the melt processable fluorochemical additive. These components are combined into a homogeneous blend which is either spunbonded or meltblown to form the fabric layer.

The meltblown fabric layer can be prepared by extruding the homogeneous blend in molten form through a plurality of fine, usually circular capillaries of a die. A high-velocity, usually heated gas (e.g., air) stream attenuates the filaments of molten thermoplastic material to reduce their diameter. Thereafter the meltblown fibers, which include any melt processable additives that were present in the blend, are carried by the high-velocity heated gas stream and are deposited on a collecting surface to form a nonwoven web of randomly dispersed meltblown fibers. In accordance with the preferred embodiment, the base polyolefinic resin of the meltblown fabric layer is polypropylene. Polymers other than polypropylene, such as nylon, polyethylene, polyester, and copolymers and blends thereof, may also be used as the base resin.

The spunbonded fabric layer may be produced by continuously extruding the homogeneous blend through a plurality of fine, usually circular capillaries of a spinnerette. Pressurized cooling air is fed to a quenching chamber wherein the filaments are cooled. The cooling air is then accelerated through a nozzle by a positive air pressure. The friction between the flowing air and the filaments creates a force which draws the filaments, i.e., attenuates the filaments to a smaller diameter. The filaments are drawn to achieve molecular orientation and tenacity. The continuous filaments are then deposited in a substantially random manner to form a web of substantially continuous and randomly arranged, molecularly oriented filaments. The preferred base polyolefinic resin used to make spunbonded fabric layers is polypropylene, although nylon, polyethylene, polyester, and copolymers and blends thereof can be used.

The nonwoven fabric of the invention has a least one layer. Multiple fabric layers are encompassed by the invention, with numerous variations of spunbonded and meltblown fabric layers possible. Multiple fabric layers are then bonded together by the application of heat and pressure to form the desired fabric composite. Spunbonded fabric layers may be prebonded by heated press rolls providing structural integrity to the fabric.

For illustrative purposes, the production of a spunbond-meltblown-spunbond (SMS) fabric structure of the invention is described. The production line illustrated in FIG. 1 can be operated at a speed in the range of 250 to 600 m/min, preferably about 375 m/min. The equipment of production line 10 consists of an endless foraminous forming belt 12 wrapped around rollers 14 and 16. The belt 12 is driven in the direction shown by the arrows. The production line 10 includes a forming machine which has three stations: spunbond station 18, meltblown station 20 and spunbond station 22. In other embodiments, depending on the desired fabric structure, not all these stations may be operating.

For the SMS structure, first, the spunbond station 18 lays down a web 8 of spunbonded fibers 28 onto the carrier belt 12. Then the meltblown station 20 lays down a web 4 of meltblown fibers 26 onto the spunbonded web 8. Lastly, the spunbond station 22 lays down a web 6 of spunbonded fibers 30 onto the meltblown web 4. Alternatively, each of the component fabric layers may be formed separately, rolled, and later converted to the SMS fabric laminate offline.

The spunbond stations 18 and 22 are conventional extruders with spinnerettes which form continuous filaments of a polymer/melt additive and deposit those filaments onto the forming belt 12 in a random interlaced fashion. Each spunbond station may include one or more spinnerette heads depending on the speed of the process and the particular polymer being used. Forming spunbonded material is a conventional process well known in the art.

The meltblown station 20 consists of a die 24 which is used to form microfibers 26. As the homogeneous blend exits the die 24, the polymer threads are attenuated and spread by high-pressure fluid, usually air, to form microfibers 26. The microfibers 26 are randomly deposited on top of the spunbond layer 8 and form a meltblown layer 4. The construction and operation of the meltblown station 20 for forming microfibers 26 are well known in the art.

In accordance with the SMS embodiment of the invention, the meltblown fabric layer has a basis weight of approximately 1.5 gsy, while the total basis weight of the spunbonded fabric layers is 10 gsy. However, in accordance with the broad concept of the invention, the basis weight of the meltblown fabric layer can be in the range of 0.5 to 6.0 gsy, while the total basis weight of the spunbonded fabric layers can be in the range of 6.0 to 20.0 gsy. Further, in accordance with the invention, the meltblown fibers have an average diameter of 1–10 $\mu$m, preferably 3–5 $\mu$m, while the spunbonded fibers have an average diameter of 10–30 $\mu$m, preferably 12–20 $\mu$m. In this embodiment the SMS fabric laminate has a mean pore size in the range of 15–50 $\mu$m, preferably about 30–40 $\mu$m. The molten polypropylene used to make the meltblown fibers has a molecular weight distribution in the range of about 1.8–5.0, preferably 3.6, and a melt flow rate in the range of about 400–3000 grams/10 minutes, preferably about 1200 grams/10 minutes, whereas the molten polypropylene used to make the spunbonded fibers has a molecular weight distribution in the range of about 1.8–5.0, preferably 2.5–2.7, and a melt flow rate in the range of about 10–100 grams/10 minutes, preferably about 35 grams/10 minutes.

Out of the forming machine, the SMS fabric laminate web 2 is then fed through bonding rolls 32 and 34. The surfaces of the bonding rolls 32 and 34 are provided with a pattern of raised lands which apply heat and pressure to thermally spot bond the three layers together. The bonding rolls are heated to a temperature which causes the meltblown polymer to soften. As the meltblown web 4 passes between the heated bonding rolls 32 and 34, the composite material is compressed and heated by the bonding rolls in accordance with the pattern on the rolls to create a pattern of discrete bonding areas. Such discrete area or spot bonding is well known in the art and can be carried out by means of heated rolls or by ultrasonic bonding. The bond pattern is selected to provide desired fabric strength characteristics. The pattern bonding area is not limited in accordance with the present invention, although pattern bonding areas in the range of 5–25%, preferably 14–19%, of the total fabric area are feasible. In the alternative, the laminate can be ultrasonically spot bonded or bonded by hot melt/glue adhesive lamination.

As a further illustration of the process of the invention and in accordance with another embodiment, a spunbonded/spunbonded (SS) fabric laminate is formed by operating only spunbond stations 18 and 22, i.e., meltblown station 20 is turned off. In this case, the bonding rolls 32 and 34 must be heated to a temperature which causes the spunbonded polymer to soften. The SS fabric laminate will have the same tensile strength and elongation as an SMS fabric laminate having the same spunbonded layers since the meltblown layer does not contribute to these physical properties.

Other fabric structures encompassed by the invention are formed as described by the process above and as illustrated in FIG. 1 with the number of spunbond stations, 18, 22 or meltblown stations 20 depending on the type of layers in the desired end fabric.

The following examples are for purposes of illustration only and this invention should not be considered to be limited by any recitation used therein.

EXAMPLE 1

NONWOVEN WITH IMPROVED FLAME RETARDANT CHARACTERISTICS

In this example nonwoven flame retardant and UV stable fabrics suitable for medical and industrial end uses were made using a new and a non-halogenated melt processable additive known as CGL 116 available from Ciba Specialty Canada of Mississauga, Ontario, Canada. The technical brochure of CGL 116 is incorporated herein by reference. CGL 116 is environmentally friendly, and does not have the adverse properties exhibited by the older/existing generation of flame retardant chemicals.

The structures included at least one layer of spunbond or meltblown web, to which the non-halogenated melt processable additive was added before melt spinning (i.e. as an internal melt additive). The nonwoven fabrics made in this example meet the following key functional attributes:

(a) The structures passed the NFPA 701-1989/1996, NFPA 702-1980 flammability tests.

(b) The structures possess acceptable physical properties as measured by grab/strip tensile tests and trapezoidal tear tests.

(c) The fabrics were acceptable for medical industry usage, i.e. non-toxic in nature.

TABLE I below describes two nonwoven fabrics of the invention. Both sample 1 and 2 were made by spunbonding. The weight %'s indicate the amount of material in the final fabric layer. Other examples of flame retardant nonwoven structures not illustrated include meltblown (MB), SS (spunbond-spunbond), SMS (spunbond-meltblown-spunbond) and SMMS (spunbond-meltblown-meltblown-spunbond) nonwovens.

TABLE I

| MATERIAL COMPOSITION AND PROPERTIES | SAMPLE 1 | SAMPLE 2 |
| --- | --- | --- |
| | 33.9 gsm (28.4 gsy) | 33.9 gsm (28.4 gsy) |
| TECHNOLOGY | SPUNBOND | SPUNBOND |
| POLYOLEFINIC RESIN | Polypropylene resin with MFR of 35–40; Weight % = 99.7 | Polypropylene resin with MFR of 35–40; Weight % = 99.4 |
| MELT PROCESSABLE COMPOUND | CGL 116 Weight % = 0.3 | CGL 116 Weight % = 0.6 |

Samples 1 and 2 are nonwoven spunbond fabrics and were made according to the process of the invention as described herein and illustrated in FIG. 1. The particular process conditions for samples 1 and 2 are detailed in TABLE II below.

The melt processable additive CGL 116 was combined with a carrier resin comprised of a 12 MFR polypropylene resin and blended with a base polypropylene resin. This was let-down at a ratio of 3% and 6% respectively during melt spinning to obtain a final fabric add-on of 0.3% and 0.6% respectively in samples 1 and 2.

TABLE II

| MATERIAL COMPOSITION AND PROPERTIES | SAMPLE 1 | SAMPLE 2 |
| --- | --- | --- |
| PROCESS CONDITIONS | | |
| BASIC WEIGHT, gsy | 28.40 | 28.40 |
| gm/hole/min. | 0.31 | 0.31 |
| DIE MELT temperature, ° C. | 232.00 | 232.50 |
| SUCTION AIR, rpm | 1,978.00 | 1,978.00 |
| COOLING AIR, rpm | 2,405.00 | 2,407.00 |
| SPIN-BELT, m/min. | 32.90 | 33.00 |
| CALENDAR nip pressure, pli | 355.00 | 354.00 |
| SURFACE TEMPERATURE Engraved/Smooth ° F. | 275/273 | 275/273 |

Flammability testing of the samples revealed that the disclosed materials have a tendency to extinguish the flame upon igniting. The results of the NFPA 701-1989 test are given in TABLE III below.

TABLE III

FLAMMABILITY TEST RESULTS

| MATERIAL | CHAR length, in | AFTER FLAME, sec | DRIPS continue to burn, YES/NO |
| --- | --- | --- | --- |
| CONTROL WITH NO FR | 5.25 | 2.00 | YES |
| SAMPLE 1 | 6.00 | 0.00 | NO |
| SAMPLE 2 | 5.25 | 0.00 | NO |

Several variations of the nonwoven fabric made in this example in accordance with the invention process are possible. Although the flame retardant structure is described in this example as a single layer of SB or MB a composite structure is possible. Examples include SS, SMS, SMMS, or other combinations. Such a composite is made in a one-step process wherein all the layers are eventually thermally bonded together.

Alternatively, the composite structure can also be made in multiple steps by separately manufacturing the SB/MB layers and then combining them using ultrasonic lamination, adhesive lamination and other methods known to individual skilled in this art.

An advantage of this invention over prior practice in this area is in the provision of environmentally friendly and non-toxic nonwoven fabrics.

EXAMPLE 2

LIQUID BARRIER NONWOVEN WITH FLAME RETARDANT PROPERTIES

In this example a nonwoven/composite structure possessing both liquid barrier properties, flame retardancy and UV stability is produced which meet the following key requirements:

(a) The fabric achieved an alcohol repellency rating of '8' or lower when measured using the INDA standard test method IST 80.9-74 (R82).

(b) The fabric passed the NFPA 701-1989/1996 and NFPA 702-1980 flammability tests.

(c) The fabric possess acceptable physical properties as measured by grab/strip tensile tests and trapezoidal tear tests.

(d) The fabric is acceptable for medical industry usage, i.e. non-toxic in nature.

The fabric structures include at least one layer of spunbond or meltblown web, to which suitable melt processable additives were incorporated before melt spinning (i.e. as an internal melt additive).

TABLE IV below describes a nonwoven fabric of the invention having alcohol repellancy, UV stability and flame retardancy. Sample 3 was made by spunbonding. The weight %'s indicate the amount of material in the final fabric layer. Other examples of liquid barrier flame retardant nonwoven structures not illustrated include MB (meltblown), SS (spunbond-spunbond), SMS (spunbond-meltblown-spunbond) and SMMS (spunbond-meltblown-meltblown-spunbond), SSS (spunbond-spunbond-spunbond), SS-SS (spunbond-spunbond -spunbond-spunbond) SM or MS (spunbond-meltblown or vice versa), SMS-SMS (spunbond-meltblown-spunbond-spunbond-meltblown-spunbond) SMMS-SMMS (spunbond-meltblown-meltblown-spunbond-spunbond-meltblown-meltblown-spunbond) and SSMMS (spunbond-spunbond-meltblown-meltblown-spunbond) nonwoven composites.

TABLE IV

| MATERIAL COMPOSITION AND PROPERTIES | SAMPLE 3 |
|---|---|
| | 33.9 gsm (28.4 gsy) |
| TECHNOLOGY | SPUNBOND |
| POLYOLEFINIC RESIN | Polypropylene resin with MFR of 35–40; Weight % = 98.4 |
| MELT PROCESSABLE COMPOUND | CGL 116 Weight % = 0.6 FLUORCHEMICAL Weight % = 1.0 |

Sample 3 is a nonwoven spunbond fabrics and was made according to the process of the invention as described herein and illustrated in FIG. 1. The particular process conditions for sample 3 is detailed in TABLE V below. The liquid barrier, UV stable, flame retardant additives were added during melt spinning to the base polypropylene resin.

The liquid barrier fluorochemical was obtained from Techmer PPM, Clinton, Tenn. designated as S215125E117 consisting of a sky-blue color pigment, 20% of a fluorochemical and a carrier resin, 12 MFR polypropylene. As in Example 1, the melt processable additive CGL 116 (20%) was combined with a carrier resin comprised of a 12 MFR polypropylene (80%).

The liquid barrier additive S215125E117 was let-down at a ratio of 5% and the CGL 116 was let-down at a ratio of 3% respectively during melt spinning to obtain a final fabric add-on of 1.6% of active chemicals. TABLE V below shows the process conditions and the material composition.

TABLE V

| PROCESS CONDITIONS | |
|---|---|
| MATERIAL COMPOSITION AND PROPERTIES | SAMPLE 3 |
| BASIS WEIGHT, gsy | 35.00 |
| gm/hole/min. | 0.35 |
| DIE MELT temperature, ° C. | 236.20 |
| SUCTION AIR, rpm | 2,371.00 |
| COOLING AIR, rpm | 2,685.00 |
| SPIN-BELT, m/min. | 28.30 |
| CALENDAR nip pressure, pli | 400.00 |
| SURFACE TEMPERATURE Engraved/Smooth ° F. | 275/273 |

Fabric evaluations of Sample 3 revealed that the disclosed material is resistant to water-isopropyl alcohol solutions achieving a rating of '8' in the INDA standard test and also have a tendency to extinguish flame upon ignition. The results of the NFPA 701-1989 test are given in TABLE VI below.

TABLE VI

| FABRIC EVALUATIONS | | | |
|---|---|---|---|
| MATERIAL | CHAR length, in | AFTER FLAME, sec | DRIPS continue to burn, YES/NO |
| CONTROL WITH NO FR | 5.25 | 2.00 | YES |
| SAMPLE 3 | 6.00 | 0.00 | NO |

Several variations of the nonwoven fabric made in this example in accordance with the invention process are possible. Although a liquid barrier, flame retardant structure is described in this example as a single layer of SB or MB a composite structure is possible. Examples include SS, SMS, SMMS, or other combinations. Such a composite is made in a one-step process wherein all the layers are eventually thermally bonded together.

Alternatively, the composite structure can also be made in multiple steps by separately manufacturing the SB/MB layers and then combining them using ultrasonic lamination, adhesive lamination and other methods known to individual skilled in this art. An example of such a fabric is an SS-SS ultrasonic composite.

A liquid barrier nonwoven or composite possessing flame retardant properties suitable for medical use has hitherto not been possible before in a one-step process. Nonwovens possessing either liquid barrier or flame retardant properties have been made before but separately. An advantage of this invention over prior practice in this area is in the provision of environmentally friendly and non-toxic nonwoven fabrics.

EXAMPLE 3

OUTDOOR COVER SUBSTRATE WITH ENHANCED UV STABILITY

In this example a nonwoven/composite structure possessing both UV stability and flame retardancy was made meeting the following key requirements:

(a) The fabric structure had a useful service life of from six (6) months to sixty (60) months as measured by accelerated indoor tests such as QUV-B/Xenon arc and outdoor tests such as exposed panels.

(b) The fabric structures pass the NFPA 701-1989/1996 and NFPA 702-1980 flammability tests.

(c) The fabric structures possess acceptable initial physical properties as measured by grab/strip tensile tests and trapezoidal tear tests.

(d) The fabric structure does not suffer a loss of more than 50% of its initial MD, CD tensiles and initial MD, CD trapezoidal tear values.

(d) Color shift is maintained within tolerances over the entire service life.

The fabric structures include at least one layer of spunbond or meltblown web, to which suitable melt processable additives were incorporated before melt spinning (i.e. as an internal melt additive).

TABLE VII below describes two nonwoven fabrics of the invention having UV stability and flame retardancy. Samples 4 and 5 were made by spunbonding. The weight %'s indicate the amount of material in the final fabric layer. Other examples of the UV, flame retardant nonwoven structures not illustrated include MB (meltblown), SS (spunbond-spunbond), SMS (spunbond-meltblown-spunbond) and SMMS (spunbond-meltblown-meltblown-spunbond), SSS (spunbond-spunbond-spunbond), SS-SS (spunbond-spunbond -spunbond-spunbond) SM or MS (spunbond-meltblown or vice versa), SMS-SMS (spunbond-meltblown-spunbond-spunbond-meltblown-spunbond) SMMS-SMMS (spunbond-meltblown-meltblown-spunbond-spunbond-meltblown-meltblown-spunbond) and SSMMS (spunbond-spunbond-meltblown-meltblown-spunbond) nonwoven composites.

TABLE VII

| MATERIAL COMPOSITION AND PROPERTIES | SAMPLE 4 33.9 gsm (28.4 gsy) | SAMPLE 5 67.7 gsm (56.7 gsy) |
| --- | --- | --- |
| TECHNOLOGY | SPUNBOND | SPUNBOND |
| POLYOLEFINIC RESIN | Polypropylene resin with MFR of 35–40; Weight % = 99.0 | Polypropylene resin with MFR of 35–40; Weight % = 99.0 |
| MELT PROCESSABLE COMPOUND | CGL 116 Weight % = 1.0 | CGL 116 Weight % = 1.0 |

Samples 3 and 4 are nonwoven spunbond fabrics and were made according to the process of the invention as described herein and illustrated in FIG. 1. The particular process conditions for samples 4 and 5 are detailed in TABLE VIII below. The UV stable, flame retardant additive, was added during melt spinning to the base polypropyelene resin.

The melt processable additive CGL 116 (20%) was combined with a carrier resin comprised of a 12 MFR polypropylene resin (80%). This was let-down at a ratio of 5% during melt spinning to obtain a final fabric add-on of 1% of active chemicals.

TABLE VIII

| | PROCESS CONDITIONS | |
| --- | --- | --- |
| MATERIAL COMPOSITION AND PROPERTIES | SAMPLE 4 | SAMPLE 5 |
| BASIS WEIGHT, gsy | 28.40 | 56.70 |
| gm/hole/min. | 0.31 | 0.31 |
| DIE MELT temperature, ° C. | 232.60 | 231.70 |
| SUCTION AIR, rpm | 1,979.00 | 1,980.00 |
| COOLING AIR, rpm | 2,405.00 | 2,406.00 |
| SPIN-BELT, m/min. | 33.10 | 15.80 |
| CALENDAR nip pressure, pli | 356.00 | 551.00 |
| SURFACE TEMPERATURE Engraved/Smooth ° F. | 275/273 | 279/277 |

Several variations of the nonwoven fabric made in this example in accordance with the invention process are possible. Although a UV, flame retardant structure is described in this example as a single layer of SB or MB a composite structure is possible. Examples include SS, SMS, SMMS, or other combinations. Such a composite is made in a one-step process wherein all the layers are eventually thermally bonded together.

Alternatively, the composite structure can also be made in multiple steps by separately manufacturing the SB/MB layers and then combining them using ultrasonic lamination, adhesive lamination, adhesive lamination and other methods known to individual skilled in this art.

An outdoor cover substrate possessing UV stability and flame retardant properties has hitherto not been possible before in a step process. Nonwovens possessing either UV stability or flame retardant properties have been made before but separately. An advantage of this invention over prior practice in this area is in the provision of environmentally friendly and non-toxic nonwoven fabrics.

The preferred embodiments of the invention have been disclosed for the purpose of illustration. Variations and modifications of the disclosed preferred embodiments which fall within the concept of this invention have been described and will also be readily apparent to persons skilled in the art. All such variations and modifications are intended to be encompassed by the claims set forth hereinafter.

What is claimed is:

1. A nonwoven fabric with UV stability and flame retardancy characteristics having at least one fabric layer, the fabric layer comprising:

a resin selected from the group consisting of polypropylene, polyethylene, polyester, and polymide; and a non-halogenated melt processable N-alkoxy amine compound that is the reaction product of 1,3-propanediamine-N,N"-1,2-ethanediylbis-, peroxidized N-butyl-2,2,6,6-tetramethyl-4-piperidinamine-2,4,6-trichlor-1,3,5-triazine and cyclohexane, and which is present in the fabric layer in an amount between 0.3 and 1.5 wt. %;

wherein said resin and said compound are combined into a homogenous blend which is either spunbounded or meltblown to form the fabric layer, and wherein said compound imparts both UV stability and flame retardancy qualities to the fabric layer.

2. The nonwoven fabric as defined in claim 1, wherein said homogenous blend further comprises $TiO_2$ present in said fabric layer in an amount between 0.2 to 2 wt. %.

3. The nonwoven fabric as defined in claim 1, wherein said resin is polyolefinic and is either polypropylene or polyethylene.

4. The nonwoven fabric as defined in claim 1, wherein said homogeneous blend further comprises a melt processable fluorochemical additive which provides liquid barrier properties to the fabric layer and is present in an amount between 0.5 to 2 wt %.

5. The nonwoven fabric as defined in claim 4, wherein said fabric layer is alcohol repellent.

6. The nonwoven fabric as defined in claim 1 having of at least two of said fabric layers, wherein both fabric layers are spunbonded.

7. The nonwoven fabric as defined in claim 1 having of at least two of said fabric layers, wherein one fabric layer is spunbonded and the other layer is meltblown.

8. The nonwoven fabric as defined in claim 1 having of at least three of said fabric layers, wherein all three of said fabric layers are spunbonded.

9. The nonwoven fabric as defined in claim 1 having of at least three of said fabric layers, wherein one fabric layer is meltblown sandwiched between two fabric layers that are spunbonded.

10. The nonwoven fabric as defined in claim 1 having of at least four of said fabric layers, wherein two fabric layers are meltblown and are sandwiched between two fabric layers that are spunbonded.

11. The nonwoven fabric as defined in claim 1 having of at least five of said fabric layers, wherein first and second fabric layers are spunbonded; third and fourth fabric layers are meltblown and are on top of said first and second fabric layers; and a fifth fabric layer is spunbonded and is on top of said fourth layer.

12. The nonwoven fabric as defined in claim 1 having of at least two of said fabric layers, wherein a film material is sandwiched between said fabric layers.

* * * * *